March 1, 1927.
E. M. ALFONZO
COMPRESSION FAUCET
Filed Sept. 9, 1925
1,619,781
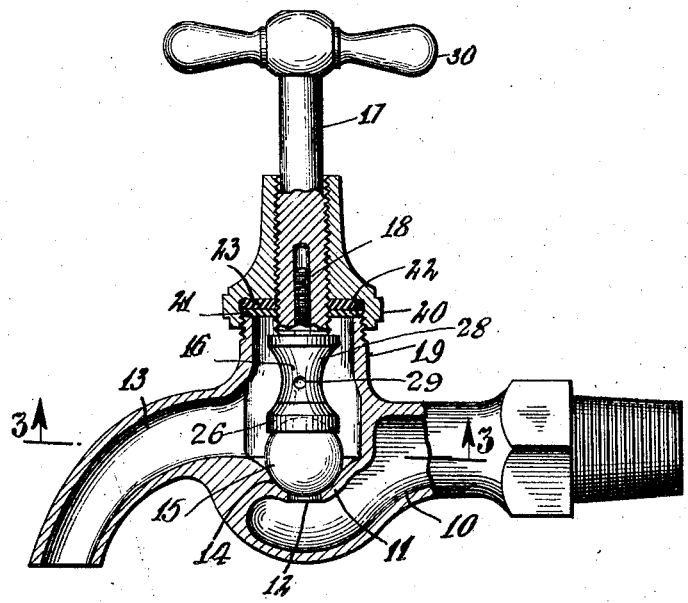
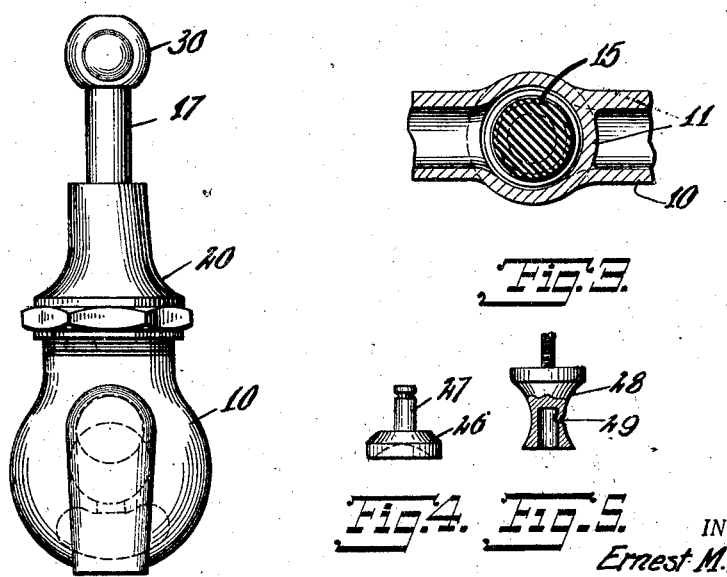
INVENTOR.
Ernest M. Alfonzo
BY
ATTORNEY Patented Mar. 1, 1927.

1,619,781

UNITED STATES PATENT OFFICE.

ERNEST M. ALFONZO, OF BROOKLYN, NEW YORK.

COMPRESSION FAUCET.

Application filed September 9, 1925. Serial No. 55,241.

This invention relates to improvements in compression bibbs, and the object thereof is to provide an article of this class which shall act efficiently to control, or to stop the flow of liquid therethrough and shall be capable of long continued use without replacement of the parts thereof.

A further object is to prevent leakage between cap and body members.

The device in the forms as shown, is such as to permit of great simplicity in the method of manufacture and resulting low cost of production.

Other features of superiority and advantage will be disclosed in the following specification.

In the accompanying drawings:

Fig. 1 shows a sectional side view of the device.

Fig. 2 shows a full end view.

Fig. 3 shows a section on the line 3—3 of Figure 1.

Fig. 4 illustrates a part of a compression member.

Fig. 5 shows the upper part of a compression member adapted to combine with the piece shown in Figure 4.

Referring to Figure 1 of the drawings; a body 10 has therein located the diaphragm 11 through which the hole 12 connects the interior of the spout 13 to that of the main body. A recess, or valve seat 14 is concentric with the hole 12 and is adapted to receive a ball member 15 which rests therein. A compression cap 16 has a concave base which rests on the top of the said member 15 and is adapted to force same downward, or to permit of its rise when the said compression cap is lowered, or raised by means of the spindle 17 to which it is secured by the threaded member 18.

The cylindrical portion 19 to which the cap member 20 is secured, has at its upper extremity an accurately finished surface on which rests a washer 21 which may be of metal, or other suitable material, and resting on this washer and against the seat 22 is another washer 23 which may be of rubber, graphite packing, or the like.

Referring to Figures 4 and 5 of the drawings; the parts shown constitute when combined, a compression cap of the form shown in Figure 1. The member 26 with shank 27 forms a rotatable base, of which the said shank 27 may be inserted within the member 28 and held in movable or rotatable relation thereto by the struck-in portion shown at 29. This structure reduces possible wear of the ball member 15, due to member 26 remaining stationary, while contacting with the ball member 15, while the member 28 revolves upon the turning of the handle 30.

The valve mechanism as shown is actuated by a handle 30 of conventional design.

It will be seen that the raising of the compression cap 16 by means of the handle 30 will permit the water, or other liquid to lift the ball 15 and flow outward through the spout member; and on the forcing down of the said compression cap will again shut off the flow.

In the form of construction shown, it may be observed that the inherent weakness of the ordinary valve washer which causes it to abrade and to present uneven surfaces to the valve seat, is completely overcome, as there is no grinding action of the ball member as shown, which would tend to roughen its surface or to cause its deterioration.

It will be further observed that the arrangement of the washers 21 and 23 in their relation to the seat 22 and the cylindrical portion 19 is such that all leakage at this point is prevented and a very objectionable feature of old type construction is eliminated thereby. The contact of the compression cap 16 when in its upper position, with the washer 21 further ensures the efficiency of the joint.

Having thus described my invention, what I claim as new and desire to secure by Letters Patent, is as follows:

A compression cap for a device of the class described, comprising a member having a screw portion for attaching to a relatively stationary part at its upper end, and an aperture at its lower end, and another member having a shank at its upper end rotatably engageable in the said aperture of first mentioned member, said latter mentioned member having a concave base.

In testimony whereof I have affixed my signature.

ERNEST M. ALFONZO.